United States Patent
McDowall et al.

[11] Patent Number: 6,075,502
[45] Date of Patent: *Jun. 13, 2000

[54] ADJUSTABLE IMMERSIVE PROJECTION TABLE

[75] Inventors: Ian McDowall, Palo Alto; Mark Bolas, Mountain View, both of Calif.

[73] Assignee: Fakespace, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/682,149

[22] Filed: Jul. 17, 1996

[51] Int. Cl.⁷ ........................................................ G09G 5/00
[52] U.S. Cl. .................................. 345/7; 345/156
[58] Field of Search ..................... 345/7, 8, 156; 362/97, 282, 307; 353/28, 122, 98, 119, 120, 74, 77, 79; 358/475, 474; 108/102, 105, 147, 7; 378/42

[56] References Cited

U.S. PATENT DOCUMENTS

| | | | |
|---|---|---|---|
| 4,114,291 | 9/1978 | Taub | 353/119 |
| 4,214,267 | 7/1980 | Roese et al. | 378/42 |
| 4,232,358 | 11/1980 | Nichols | 362/97 |
| 4,408,850 | 10/1983 | Norek | 353/122 |
| 4,637,322 | 1/1987 | Hampshire et al. | 108/102 |
| 4,647,160 | 3/1987 | Franken et al. | 353/79 |
| 4,810,087 | 3/1989 | Tachibana et al. | 353/120 |
| 5,034,732 | 7/1991 | Iino | 345/7 |
| 5,620,245 | 4/1997 | Kobayashi et al. | 353/28 |
| 5,622,419 | 4/1997 | Holder et al. | 353/119 |
| 5,726,774 | 3/1998 | Shishido et al. | 358/474 |

*Primary Examiner*—Chanh Nguyen
*Assistant Examiner*—John Suraci
*Attorney, Agent, or Firm*—Crockett & Crockett; K. David Crockett, Esq.

[57] ABSTRACT

A projection display system for use with a computer system. Used for immersive visualization and interaction tasks, the projection surface may be adjusted by the user to one of two positions. The image on the surface is generated by a computer and displayed by a projector on the table's surface.

2 Claims, 7 Drawing Sheets

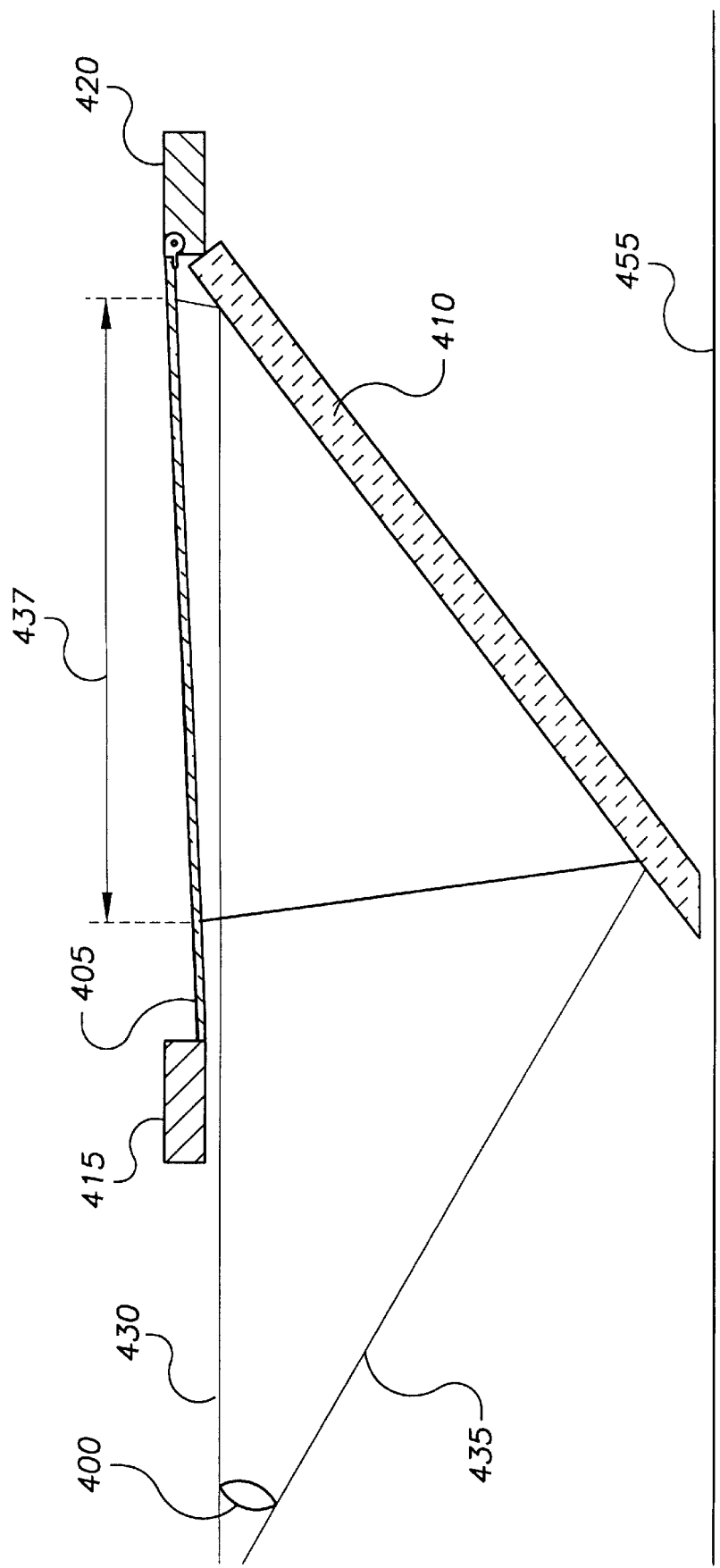

ADJUSTABLE IMMERSIVE PROJECTION TABLE

This application is a continuation of co-pending application Ser. No. 08/682,149, filed Jul. 17, 1995.

BACKGROUND OF THE INVENTION

A number of research organizations have been investigating the use of projection based display systems as an approach for providing an enhanced view of computer results. The results of the research are displayed in stereo on a large flat surface. The researcher wears a head tracked pair of stereo flicker glasses and looks at the table top where an image from a computer is projected on the surface by a video projector. The computer produces a stereo pair of images which the viewer sees. Computer generated objects appear to be in and above the table from the viewer's perspective. This invention is a novel implementation of such a display table which offers an additional unique and useful feature—the table top can be adjusted to an inclined position thus providing a larger stereo working volume.

1. Field of Invention

This invention relates to the field of stereo projection and immersive computer interfaces.

1. Description of the Prior Art

Several research groups including GMD in Germany, Stanford University in California, Naval Research Labs, NASA Ames, and others have developed visualization systems which are based around a flat projection table. A table with a translucent surface (generally about 4 foot by 6 foot) is constructed and a mirror angled beneath the translucent surface. The angled mirror reflects light from a video projector located behind the table onto the translucent surface. The projector is driven by a computer. Rather than simply have the images from the regular computer monitor appear on the large table top, the computer and projector are set up to display a stereo pair of images (field sequential stereo) on the table top. The user wears stereo glasses (such as those for Tektronix™ or StereoGraphics™) when looking at the images on the table top. Thus, the viewer sees a stereo image on the table top. This system is further enhanced by the use of a head tracker. The head tracker is attached to the viewers head (or the stereo glasses) and is used by the computer in re-computing the images projected on the table. The data from the head tracker (typically an Ascension or Polhemus) permits the computer to recalculate the image in such a way as to make it appear as if there is an actual "object" on/in the table. Thus, one can look at a coffee cup on the table and look around at the other side of it by walking around the other side of the table.

This arrangement means that the users working volume is as shown in FIG. 1—the virtual objects must, ideally, be contained in the virtual cone as shown.

In addition, other research groups, most notably at Sun Microsystems and University of Illinois, have taken a different approach in which these environments are presented on predominantly vertical walls on which stereo images are presented. A full room constructed in this way is known as a Cave and a single wall Cave is known as an Immersadesk. These approaches offer a larger viewing volume than the table top methods. A predominantly vertical projection surface does however create a very different immersive experience with different limitations—for instance it is impossible to look down on an object.

SUMMARY OF THE INVENTION

The immersive table described below uses a translucent surface and mirror which can be adjusted to two positions. The table top and mirror are moved by the same physical linkage so that the motion of the mirror and the motion of the screen move in such a way as to provide an image in the two different positions. This table is adjusted by a pair of handles which are moved to one of two positions.

This adjustment ability is used to take advantage of the benefits of having both a horizontal and a vertical projection immersive interaction systems in a single device. The system can be adjusted between a predominantly vertical mode and a horizontal mode. This permits a user to adjust the angle of the table surface for different applications. Since the position of the table top and the mirror are mechanically linked—they adjust together and the image is positioned correctly on the translucent table top.

It will be appreciated from the description of the immersive system that it may be used in many environments and in many embodiments. In fact the system described is but one embodiment, and the inventive concepts, methods and devices described below may be employed in a number of settings. For example, the ideas described could be applied to a drafting table with a translucent surface on which an image is projected —the table's angle may be adjusted and the image quality maintained.

BRIEF DESCRIPTION OF THE DRAWINGS

FIGS. 4a and 4b show the geometry of the projector relative it the mirror and table top at different table top angles.

DESCRIPTION OF THE REFERENCE NUMERALS IN THE FIGURES

Figure 1:
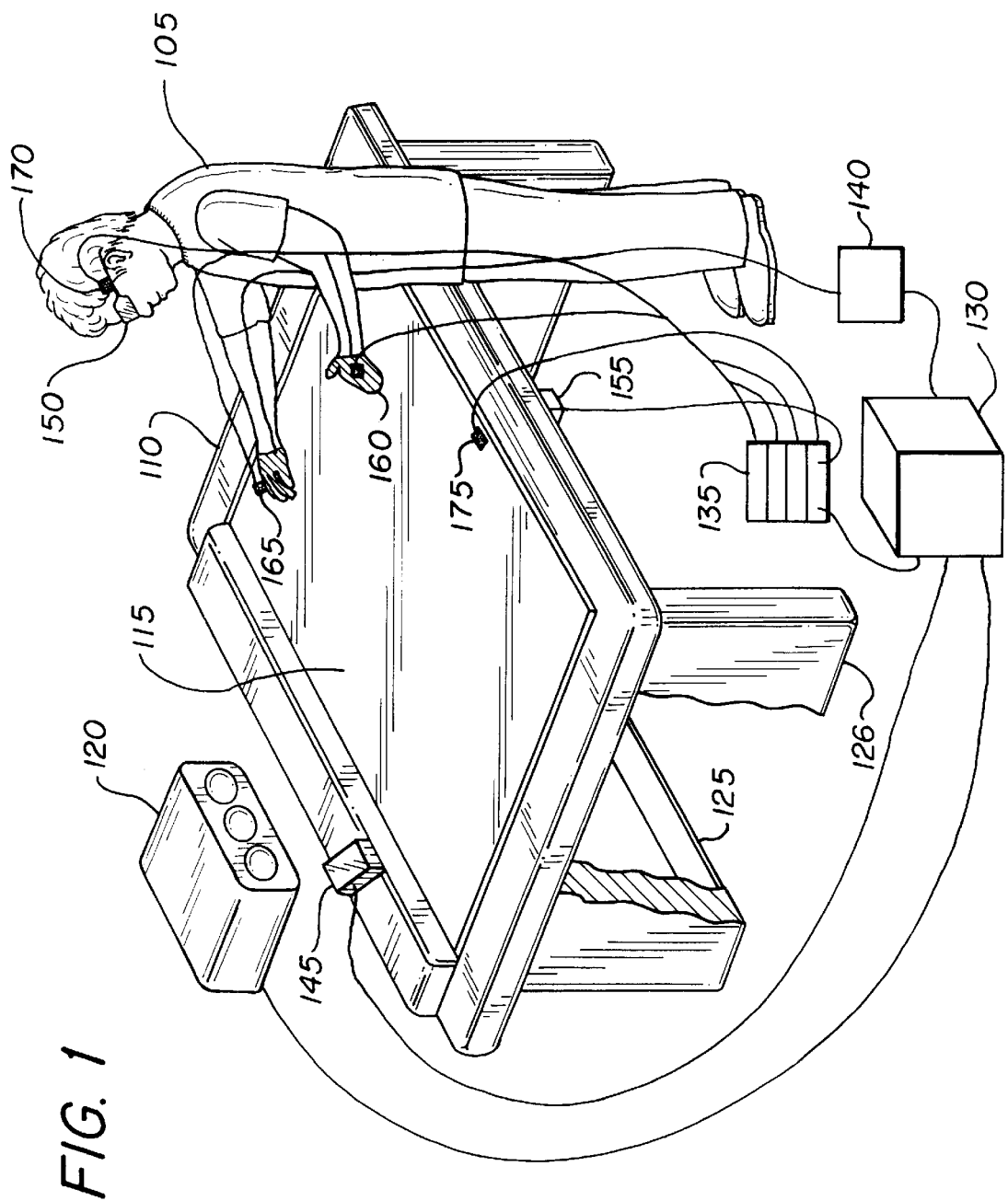
FIG. 1 shows the overall system—a viewer is looking at the table surface in the flat position and is interacting with a 3D computer generated model which appears to be floating on/in the table top.

105 The viewer
110 The rear projection table
115 The translucent viewing surface of the table
120 The video projector
125 Angled mirror below the table
130 Host computer
135 Interface to hand tracker and head tracker
140 Interface to gloves
145 Transmitter for Stereo Flicker Glasses
150 Stereo flicker glasses
155 Tracker source
160 Tracker for left hand on back of sensed glove
165 Tracker for right hand on back of sensed glove
170 Tracker for head
175 Tracker for table top angle
205 Table
210 Translucent projection screen inset into table top
215 Left leg of table
220 Inside face of right leg
225 Right table leg 305 Table base
310 Projection surface frame
320 Strut which lifts one side of the table top (there is one the other side too)
325 Cable attached to table top frame 310 which lifts the mirror
400 Projector Lens
405 Translucent table surface
410 Mirror
415 Rear table support
420 Front table support
425 Hinge joint
430 Ray from projector lens
435 Ray from projector lens
437 Extent of image coverage from projector
440 Mirror in second position
445 Extent of image coverage in tilted configuration
450 Translucent image surface in tilted position
455 Floor
456 Floor
500 Translucent screen material in frame
505 Mirror mounted on a frame for stability
505 Pivot point for lit arm 515
515 Lift arm—pivots at 510 an has two stops—526 and 527
520 Top lift arm—pivots at lift arm 515 and fits into a pocket on 500
525 Handle at lift arm
526 Stop for lift arm—gravity hods the arm on the stop
527 Upper position stop
530 Pulley wheel attached to mirror assembly
535 Cable attachment point—does not move
536 Cable
537 Cable is attached to the table top 500
540 Pivot point
545 Arm in upper position
550 Mirror assembly in upper position
555 Translucent screen in frame at inclined position
560 Upper stop

DETAILED DESCRIPTION OF THE INVENTION

FIG.1 shows the table 110 with a viewer standing in front of it. The viewer 105 looks at the translucent table top 115 trough a pair of flicker stereo glasses 150 which have head traker 170 attached. The viewer sees a stereo pair of images from computer 130 via the projector 120 which projects an image which appears on the table surface 115 after being reflected in a large angled mirror 125 which is located beneath the surface of the table. The leg 126 has been cut away to reveal the mirror. In use the computer 130 gets information from the head tracker 170 and right 165 and left 160 hand trackers via interface 135 which provides a common interface for the position and orientation tracking. The trackers are generally electromagnetic and are referenced to a source 155. In addition to tracking the parts of the user, an additional tracker 175 may be used to relay information about the state of the table surface back to the application software running on computer 130. The user may also employ gloves or other manipulators in the works pace. These interface back to the computer 130 via interface electronics 140.

Figure 2:
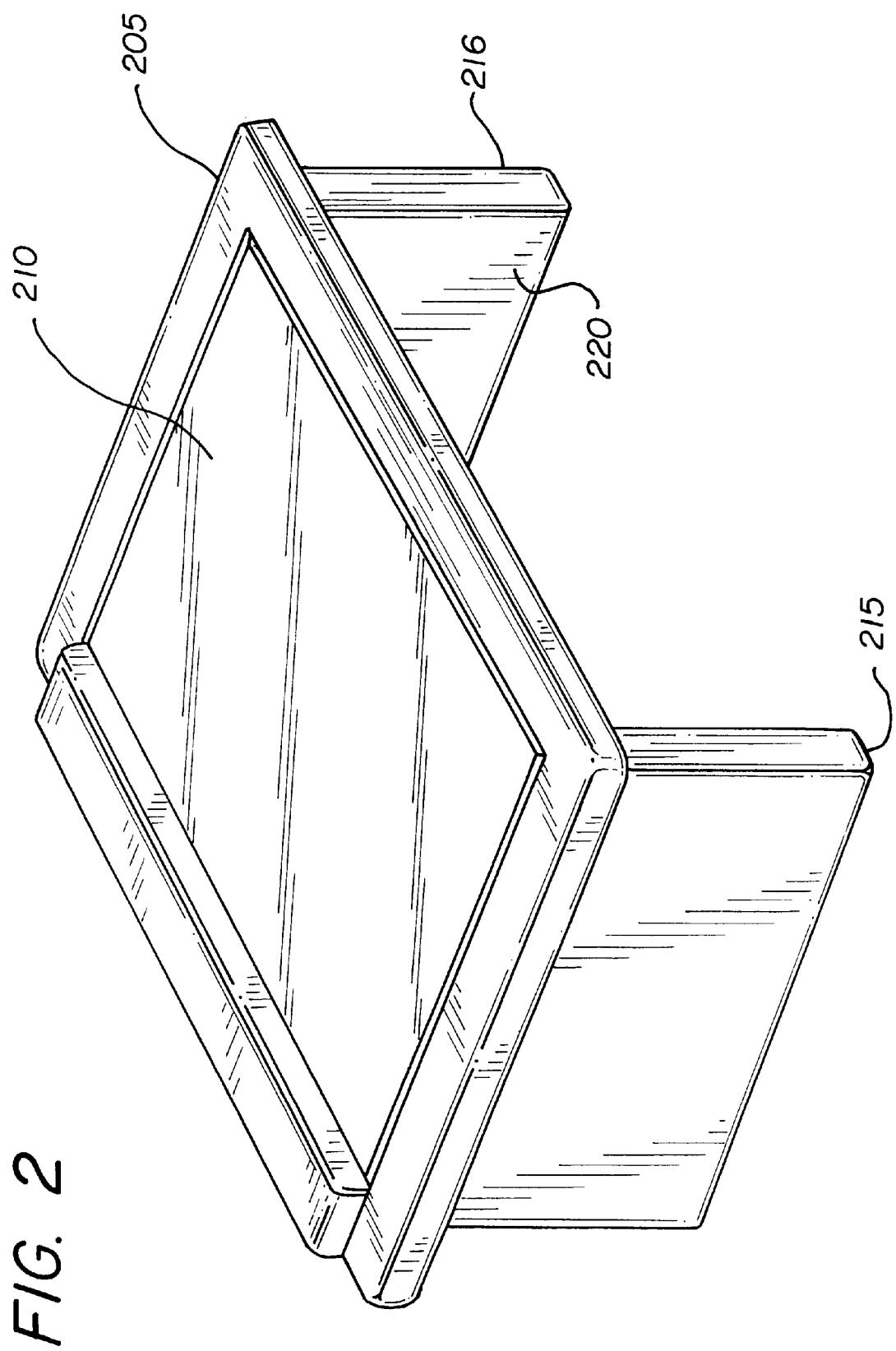
FIG. 2 shows the basic table in the flat or horizontal position. The translucent projection surface is mounted in the table surface somewhat flush with the surrounding frame of the table its self.
Figure 3:
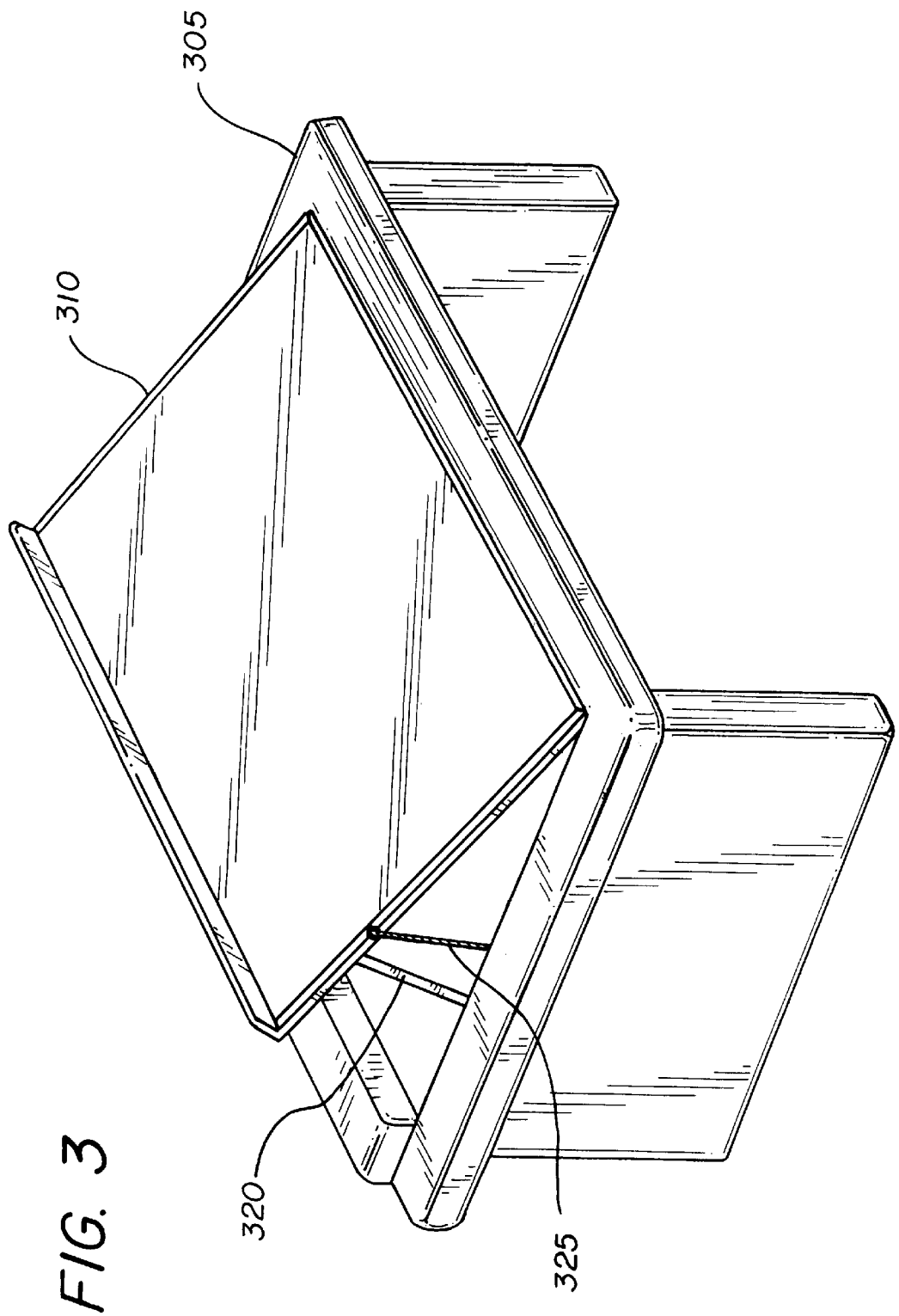
FIG. 3 shows the table in the inclined position—the projection surface and a narrow frame are now tilted towards the viewer. One of the two arms which lift the table top are shown.

The table itself is shown in FIG. 2 from the user's point of view the table is composed of the viewing area 210 and the table 205. FIG. 3 shows the table in the inclined position. Again the user sees the table surface 325 and the table itself 305. Along each of the two sides of the table there is a strut 320 and a cable 325. The strut holds the table surface 325 in the up position, the cable 325 is connected to a fixed point and runs under a pulley which is attached to the mirror. In this way, the relative angle between the table top 325 and the mirror may be controlled.

Figure 4B:
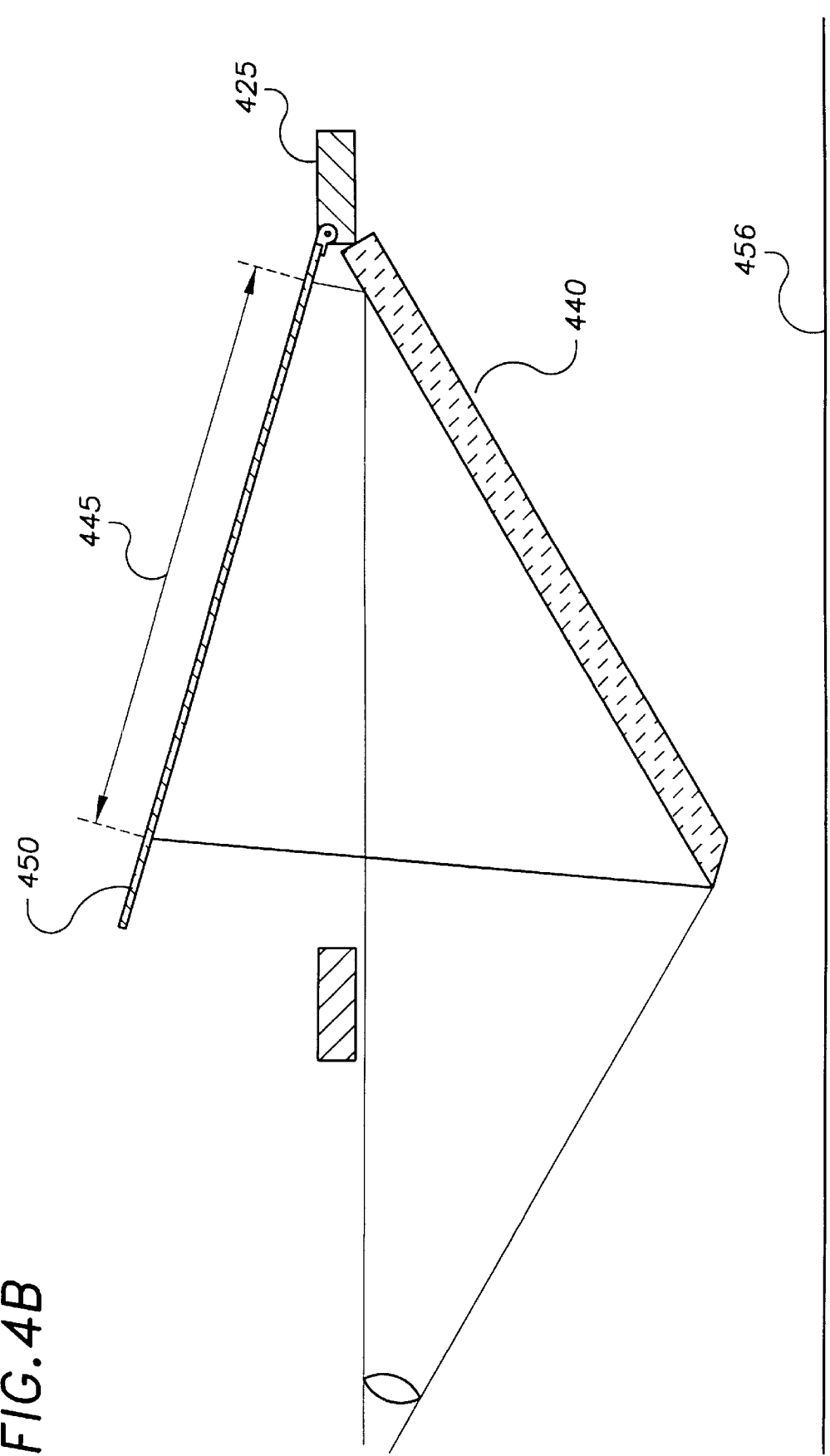

FIG. 4A shows the geometry of the projector with lens 400, the inclined mirror 410 and the table top 405. In this case the image bounces through mirror 410 and appears on the translucent surface 405, the image will extend over the range indicated by 437. Note the throw angle from the projector lens 400 is the angle between ray 430 and ray 435. If the projector was equipped with a wider angle lens then the projector could be moved closer to the back edge of the table 415 which would reduce the overall footprint of the system. The viewer stands in front of the table edge 420 to look down at the images projected onto the table surface. Where an image from the projector 400 is seen. The floor 455 intersects the mirror 410 which restricts the size of the mirror 410. In the inclined position as shown in FIG. 4B the mirror and table top pivot about 425. The mirror 440 rotates to the position shown and the table top 450 rotates to the inclined position shown. The image from the projector hits the mirror 440 and is reflected onto the screen 450. The image appears in the area 445 where it can be seen by the viewer. In this position more of the mirror is used. Note that an additional flap could be attached to the bottom end of the mirror so that in the inclined position the mirror is effectively larger than in the down position where the flap would fold up out of the way along the floor 456.

Figure 5A:
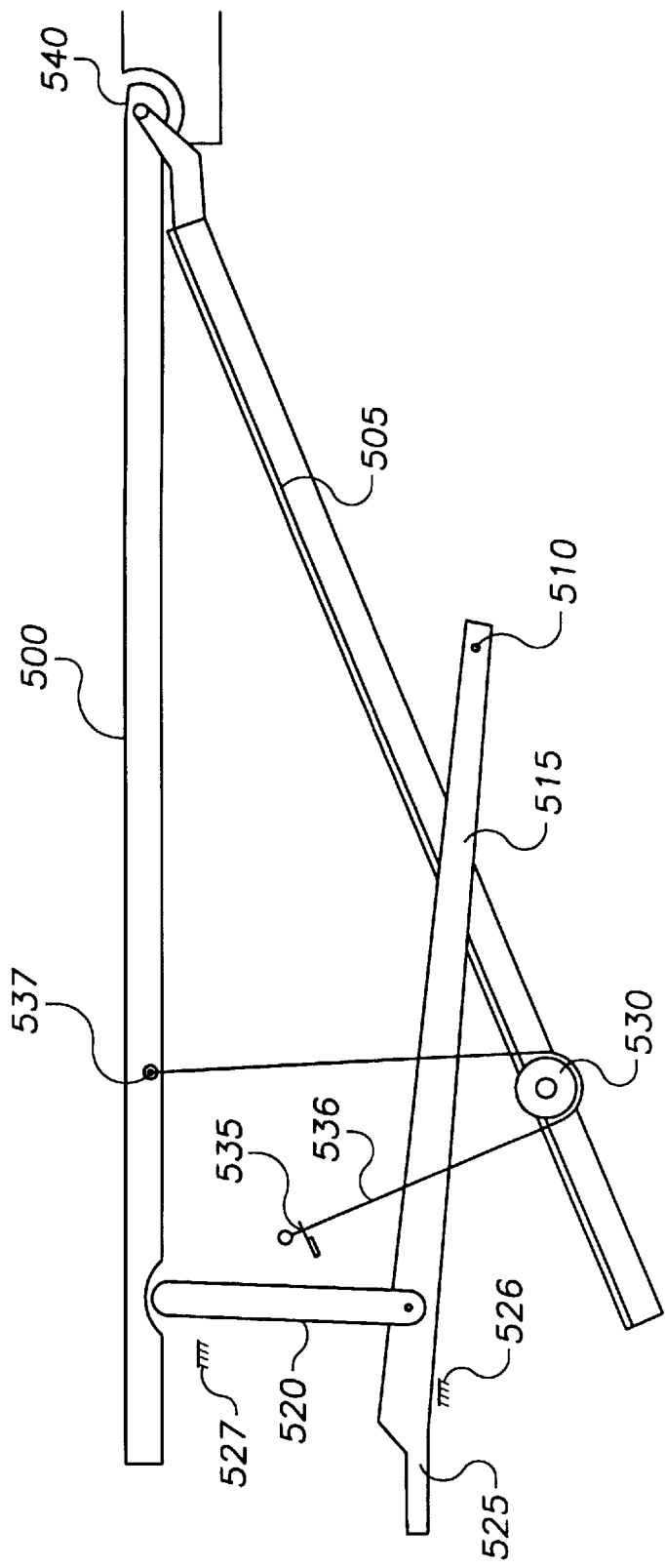
FIGS. 5 and 5b illustrate the movement of table components relative to each other on adjustment.
Figure 5B:
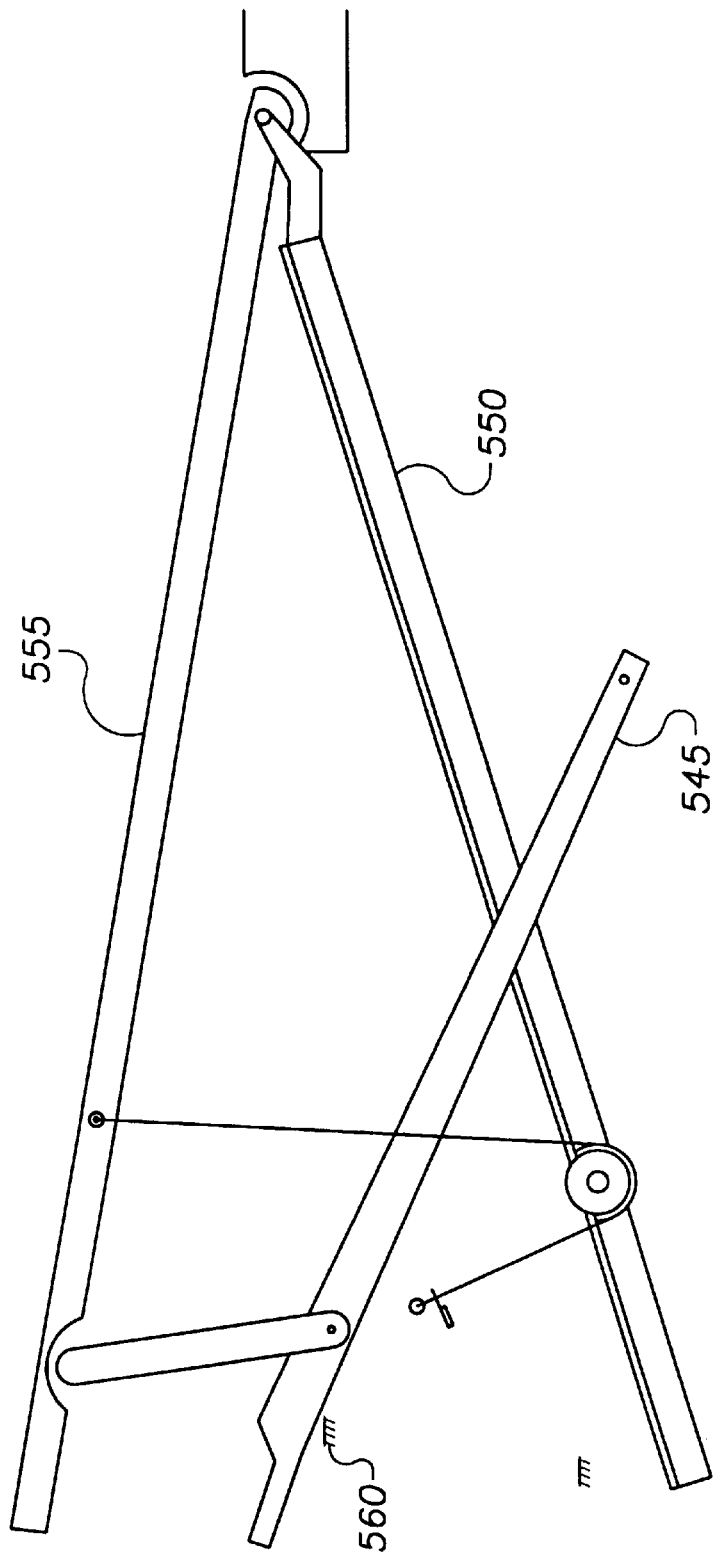

The mirror and table top can be moved together in a number of ways. One manual way which works well is a combined lever and cable method shown in FIG. 5A and 5B—this assembly is mounted on the inside edge of both the wide legs which hold the table up. The mechanism as of 5A mounts on the inside edge of the legs 215 and 216 shown in FIG. 2. With the table top in the flat position as shown in FIG. 5A translucent top with frame 500 is horizontal and is held up by rotary joint 540 and strut 520 which is in a pocket on table top 500. Strut 520 is attached to arm 515 at a pivot joint. The lift arm 515 is attached to the leg of the table at pivot 510 and rests on one of two stops, the lower one 526 and the upper one 527 also attached to the table leg. The lift arm 515 is used by a person holding the handle 525 and lifting it from resting on stop 526 up to stop 527. To lower the screen and mirror the person lifts the handle off stop 527 and lowers it to stop 526. The screen is lifted or lowered by the strut 520 . The mirror assembly 505 pivots about rotary joint 540 also and is adjusted by a cable assembly. The cable 536 runs from the hold point fixed on the leg 535 under a pulley 530 which is attached to the mirror 505 and up to an attachment point on the frame for the screen 537 which is part of 500. Note that the net effect of having the cable run in this way is that the mirror's angle changes at a slower rate than the screen. By adjusting the attachment point 537 and the location of pulley 530 on the mirror, the exact geometry of the up and down positions can be arranged. The exact geometry desired depends on the throw angle of the projector, and the configuration chosen for the up and down positions. In the up position as shown in FIG. 5B, the screen 555 is now inclined by ten degrees. The lift arm 545 is resting on the top stop 560. The mirror 550 has also moved by less than 5 degrees as the cable was lifted by the screen 555. The angle through which the mirror moves is determined by the position of the pulley 530 on the mirror 505 and the point from which the cable is lifted 537. Note that the cable also gives a mechanical advantage of about 2 which makes the arm easier to lift. The assembly shown is duplicated on both sides of the table on the inside edge of each leg. Adjustment from one position to the other currently requires two people, one for each side.

When the table is in the up position, the images the computer produces need to be calculated to take this into account. In order for the computer to know which position the table is in, a tilt sensor can be attached to the table surface (or another moving part) so this can be taken into account. Another way of returning this information tot he computer would be to mount a micro switch at a moving part in the lift assembly. The data from the switch could be returned to the computer 130 either through the tracker interface 135, the glove interface 140, or an alternate interface.

While the preferred embodiments of the devices and methods have been described, they are simply illustrative of the principles of the invention. While the preferred embodiments have been described in the environment of a manually adjustable table for visualization, it should be apparent from the discussion above that a tiltable imaging surface may be realized in many ways. Other embodiments and configurations may be devised without departing from the spirit of the inventions and the scope of the following claims. It is expected that, for instance, in addition to a manual method of adjusting the position of the mirror and the table surface, a motorized method is clearly an alternative. Also, the current implementation provides two fixed positions—this could be extended to a system which provided a more continuous range of adjustment. By folding the projection beam, the projector is positioned conveniently behind the table, it is envisaged that by adding another mirror that the projector could be placed closer to the table. There is also the possibility of having the table surface itself be the display, a large flat panel for instance.

We claim:

1. A projection table comprising:

a translucent projection surface with an inclined mirror positioned below said surface, and a mechanism for adjusting the angle of said surface and mirror;

wherein the mirror and projection surface are joined along one edge by a hinge, and;

the mechanism for adjusting the angle of the mirror and the projection surface comprises a cable and pulley wheel, wherein the mirror is suspended from the table at a point spaced from the hinge; said suspension being accomplished by the pulley wheel mounted to the mirror and a cable running from a first end fixed to the projection surface downwardly from the projection surface, through the pulley wheel, and upwardly from the pulley wheel, with the second end of said cable being fixed in space, whereby angular movement of the projection surface about the hinge causes angular movement of the mirror.

2. The projection table of claim 1 further comprising:

a projector aligned with the mirror and projection surface to project an image onto the mirror which is reflected to the projection surface;

a computer programmed to generate images and transmit said images to the projector for projection onto the mirror;

a sensor for sensing the position of the projection surface and communicating the position of the projection surface to the computer;

said computer being programmed to calculate the generated imaged based upon the surface of the projection surface.

* * * * *

UNITED STATES PATENT AND TRADEMARK OFFICE
CERTIFICATE OF CORRECTION

| | |
|---|---|
| PATENT NO. | : 6,075,502 |
| DATED | : June 13, 2000 |
| INVENTOR(S) | : Ian McDowall, Mark Bolas, Paul Turchin, Robert G. Ullrich |

It is certified that error appears in the above-identified patent and that said Letters Patent is hereby corrected as shown below:

<u>Title page,</u>
Item [75] Inventor: Delete "Ian McDowall, Palo Alto; Mark Bolas, Mountain View, both of Calif." and insert -- Ian McDowall, Palo Alto; Mark Bolas, Mountain View; Paul Turin, Berkeley; and Robert G. Ullrich, Alameda, all of Calif. --

Signed and Sealed this

Ninth Day of October, 2001

*Attest:*

NICHOLAS P. GODICI
*Attesting Officer* — *Acting Director of the United States Patent and Trademark Office*